US012792109B2

(12) United States Patent
Cheng et al.

(10) Patent No.: US 12,792,109 B2
(45) Date of Patent: Nov. 10, 2026

(54) ELECTRONIC DEVICE AND CONTROL METHOD THEREOF

(71) Applicant: COMPAL ELECTRONICS, INC., Taipei City (TW)

(72) Inventors: Chuang-Yuan Cheng, Taipei City (TW); Chen-Yi Huang, Taipei City (TW); Po-Yang Chien, Taipei City (TW); Po-Jui Chen, Taipei City (TW); Chun-Chieh Chen, Taipei City (TW); Yun-Tung Pai, Taipei City (TW); Chih-Wen Chiang, Taipei City (TW)

(73) Assignee: COMPAL ELECTRONICS, INC., Taipei City (TW)

( * ) Notice: Subject to any disclaimer, the term of this patent is extended or adjusted under 35 U.S.C. 154(b) by 69 days.

(21) Appl. No.: 19/060,796

(22) Filed: Feb. 24, 2025

(65) Prior Publication Data

US 2025/0278122 A1 Sep. 4, 2025

Related U.S. Application Data

(60) Provisional application No. 63/561,234, filed on Mar. 4, 2024.

(51) Int. Cl.
*G06F 1/16* (2006.01)
*G06F 1/20* (2006.01)

(52) U.S. Cl.
CPC .......... *G06F 1/1681* (2013.01); *G06F 1/1616* (2013.01); *G06F 1/1677* (2013.01); *G06F 1/203* (2013.01)

(58) Field of Classification Search
CPC .... G06F 1/1616; G06F 1/1618; G06F 1/1637; G06F 1/1681; G06F 1/1677; G06F 1/203;
(Continued)

(56) References Cited

U.S. PATENT DOCUMENTS 6,040,822 A * 3/2000 Decker ................ G06F 3/0202 345/172
6,073,187 A * 6/2000 Jacobs .................... G06F 1/165 361/679.55
(Continued)

FOREIGN PATENT DOCUMENTS

CN 110879647 A 3/2020
TW M246656 10/2004
(Continued)

OTHER PUBLICATIONS

"Office Action of Taiwan counterpart Application", issued on Nov. 24, 2025, p. 1-p. 6.

*Primary Examiner* — Sagar Shrestha
(74) *Attorney, Agent, or Firm* — JCIPRNET

(57) ABSTRACT

An electronic device includes a first body, a second body, a rotating module, and at least one light-emitting module. The rotating module is connected to the first body and the second body. The at least one light-emitting module is disposed on the rotating module. The second body is adapted to drive the rotating module to rotate relative to the first body along an axial direction to switch to an unfolding mode or a closing mode. In the closing mode, the at least one light-emitting module faces a rear end of the first body. In the unfolding mode, the at least one light-emitting module faces an upper surface of the first body.

22 Claims, 8 Drawing Sheets

(58) Field of Classification Search
CPC .. G06F 1/1633; F21V 14/025; F21V 33/0052; F21V 2200/20; H05B 47/11
See application file for complete search history.

(56) References Cited

U.S. PATENT DOCUMENTS

| | | | | |
|---|---|---|---|---|
| 7,436,657 B2 * | 10/2008 | Motai | G06F 1/162 | 362/85 |
| 7,959,311 B2 * | 6/2011 | Li | H01H 13/83 | 362/85 |
| 2005/0047073 A1 * | 3/2005 | Lo | G06F 1/1616 | 362/253 |
| 2023/0176628 A1 * | 6/2023 | Wu | G06F 1/1681 | 361/679.27 |

FOREIGN PATENT DOCUMENTS

| | | |
|---|---|---|
| TW | 201423332 A | 6/2014 |
| TW | I669597 | 8/2019 |

* cited by examiner

ELECTRONIC DEVICE AND CONTROL METHOD THEREOF

CROSS-REFERENCE TO RELATED APPLICATION

This application claims the priority benefit of U.S. provisional application Ser. No. 63/561,234, filed on Mar. 4, 2024. The entirety of the above-mentioned patent application is hereby incorporated by reference herein and made a part of this specification.

BACKGROUND

Technical Field

The disclosure relates to an electronic device, and more particularly, to an electronic device with a light-emitting function and a control method thereof.

Description of Related Art

In an existing electronic device with light effects, a light-emitting module is usually installed at a specific position on a display body or a host body. If the light-emitting module is installed on a front side, a user may not show the light effects to others when using it. If the light-emitting module is installed on a back side or both sides, the user may not directly see the light effects.

In short, in the existing electronic device, an installation position of the light-emitting module is fixed, and the user may not adjust the position of the light-emitting module by himself, which results in limitations in a light-emitting function. If the light effects on the front, back, or both sides are to be achieved, multiple sets of light-emitting modules are required to be installed, which has disadvantages of taking up the space of the body and being expensive.

SUMMARY

The disclosure provides an electronic device that changes an orientation of a light-emitting module in an unfolding mode and a closing mode, thereby allowing a light to be transmitted to different positions of the electronic device.

An electronic device in the disclosure includes a first body, a second body, a rotating module, and at least one light-emitting module. The second body is adapted to display a frame. The rotating module is connected to the first body and the second body. The at least one light-emitting module is disposed on the rotating module. The second body is adapted to drive the rotating module to rotate relative to the first body along an axial direction to switch to an unfolding mode or a closing mode. In the closing mode, a light-emitting direction of the at least one light-emitting module faces a rear end of the first body. In the unfolding mode, the light-emitting direction of the at least one light-emitting module faces a front end of the first body relative to the rear end.

The disclosure provides a control method of an electronic device, which generates the corresponding light according to different conditions.

The control method of the electronic device in the disclosure includes the electronic device and a processing unit, which is coupled to the at least one light-emitting module and controls the at least one light-emitting module to generate a light.

Based on the above, in the electronic device of the disclosure, the light-emitting module is installed on the rotating module, so the illumination angle may be changed with the rotation of the rotating module. In the closing mode, the light-emitting module faces the rear end of the first body, allowing the light to propagate in a direction away from the user and display it to others. In the unfolding mode, the light-emitting module faces the upper surface of the first body, allowing the light to propagate to the front and the two sides of the first body for display to the user. Furthermore, the electronic device of the disclosure does not require multiple light-emitting modules to be installed at multiple positions of the electronic device. Compared to the conventional technology, it may improve disadvantages of taking up the space of the body and being expensive.

DETAILED DESCRIPTION OF DISCLOSED EMBODIMENTS

Figure 1A:
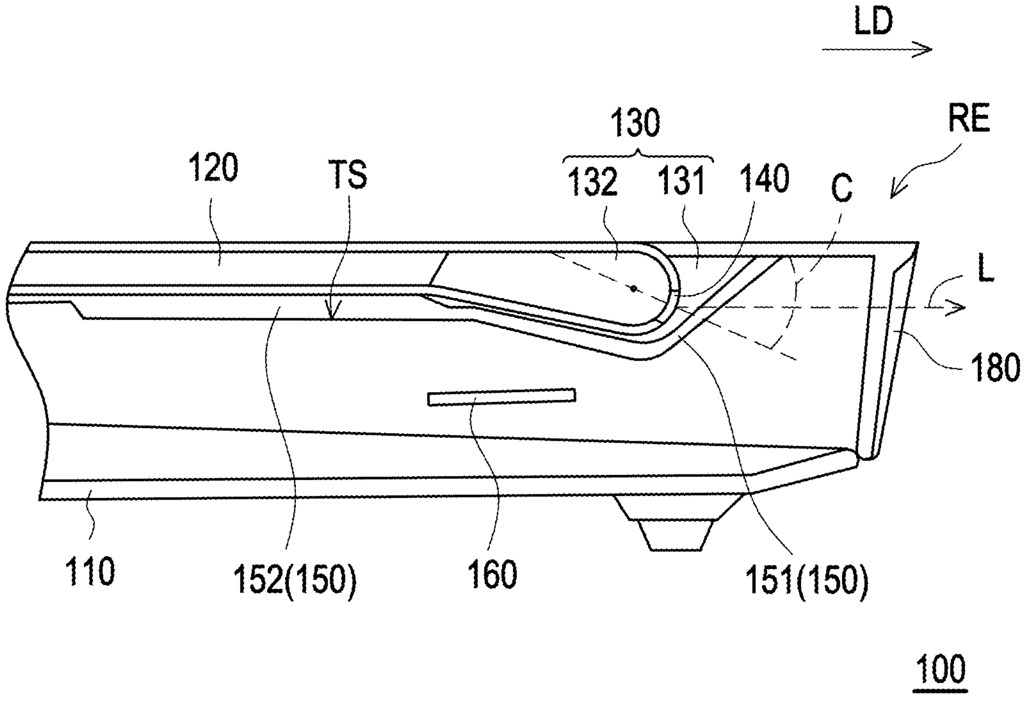
FIG. 1A is a schematic partial side view of a closing mode of an electronic device according to an embodiment of the disclosure.
Figure 1B:
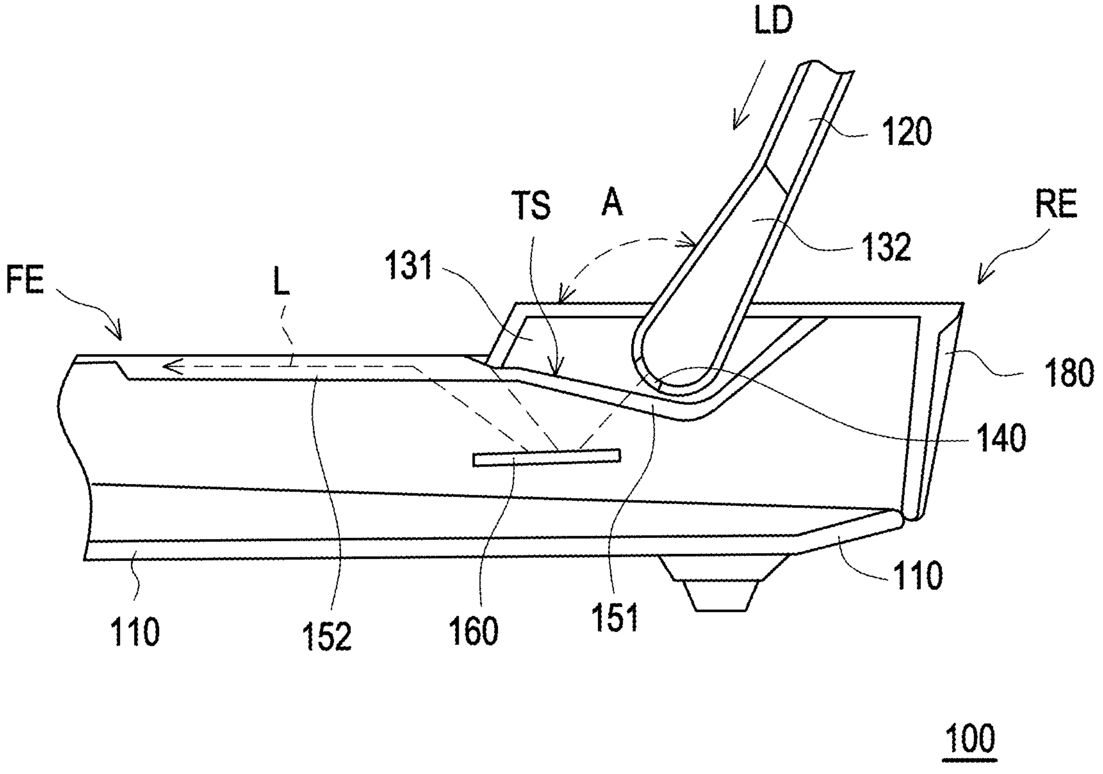
FIG. 1B is a schematic partial side view of an unfolding mode of the electronic device in FIG. 1A.
Figure 1C:
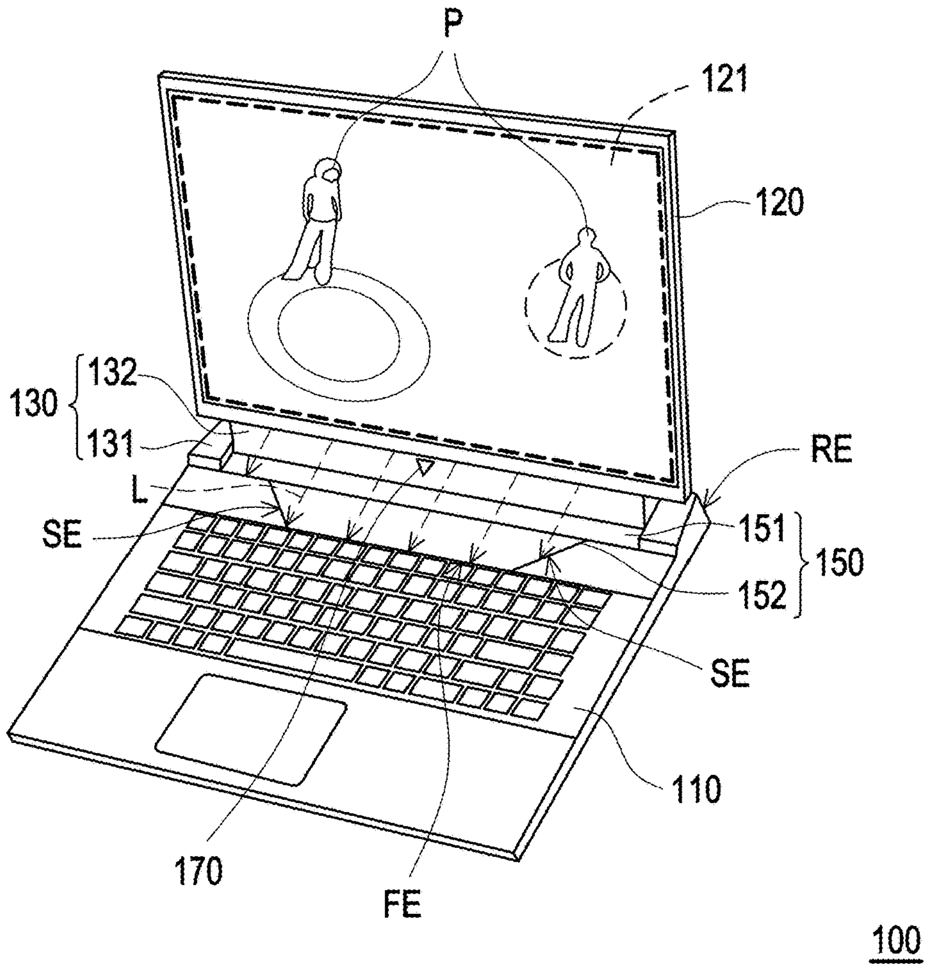
FIG. 1C is a schematic perspective view of the unfolding mode of the electronic device in FIG. 1B.
Figure 1D:
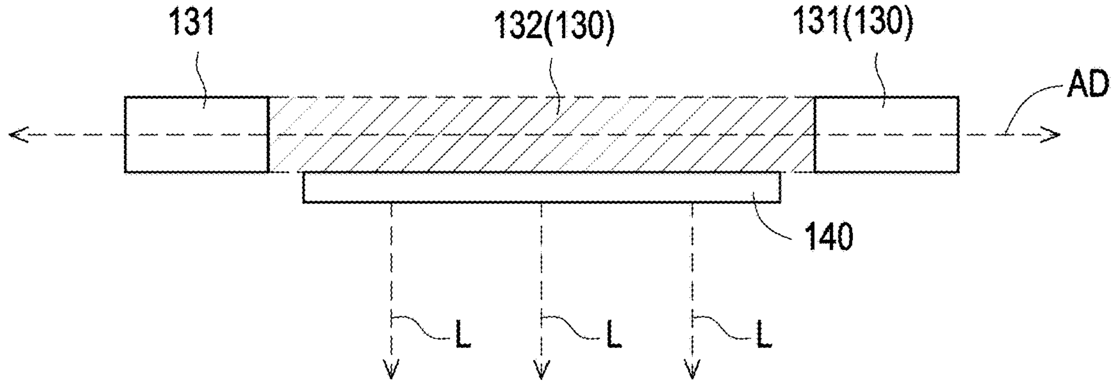
FIG. 1D is a schematic view of an illumination direction of a light-emitting module of the electronic device in FIG. 1A.

FIG. 1A is a schematic partial side view of a closing mode of an electronic device according to an embodiment of the disclosure. FIG. 1B is a schematic partial side view of an unfolding mode of the electronic device in FIG. 1A. FIG. 1C is a schematic perspective view of the unfolding mode of the electronic device in FIG. 1B. FIG. 1D is a schematic view of an illumination direction of a light-emitting module of the electronic device in FIG. 1A.

Referring to FIGS. 1A, 1B, and 1D, an electronic device 100 in this embodiment is formed by a logic body and a display body. The logic body is used to accommodate various electronic elements such as a central processing unit, a graphics chip, a hard drive, and a heat dissipation module, and has a protective function to prevent the electronic device 100 from being interfered by external electromagnetic signals or accumulation of dust during operation. The display body is electrically coupled to the logic body, and is used to output an image frame.

The electronic device 100 in the disclosure includes a first body 110, a second body 120, a rotating module 130, and at least one light-emitting module 140.

The first body 110 is a logic body, and the second body 120 is a display body. The rotating module 130 is connected to the first body 110 and the second body 120, so that the first body 110 and the second body 120 are suitable for relative unfolding and relative approaching. Furthermore, the second body 120 includes a screen 121, and the screen 121 is used to display a frame P. The frame P includes a picture, an image, and a system operating interface.

Referring to FIGS. 1C and 1D, the rotating module 130 is a three-section structure and includes two positioning portions 131 and a rotating portion 132. The two positioning portions 131 are fixed on a rear end RE of the first body 110, and are spaced apart from each other to form an accommodating space. The rotating portion 132 is fixed on the second body 120, and is pivotally connected to the two positioning portions 131. The accommodating space is for the second body 120 to rotate.

Referring to FIGS. 1C and 1D, the at least one light-emitting module 140 is disposed on the rotating portion 132 of the rotating module 130, and is located in the accommodating space. In addition, the at least one light-emitting module 140 is coupled to the first body 110 to receive an instruction. The light-emitting module 140 is formed by one or more light-emitting diodes, and a light color and a light-emitting frequency of the light-emitting module 140 are controlled by a processing unit 111 in the first body 110. The at least one light-emitting module 140 has a light-emitting direction LD, which is away from an axial direction AD of the rotating module 130. There is an included angle C between the light-emitting direction LD and the second body 120, and the included angle C is between 0 degrees and 60 degrees.

This means that the light-emitting direction LD is parallel to an extension plane of the second body 120, or the included angle C is between the light-emitting direction LD and the extension plane of the second body 120.

Referring to FIGS. 1A and 1B, the second body 120 is adapted to drive the rotating module 130 to rotate relative to the first body 110 along the axial direction AD to switch to the unfolding mode or the closing mode. In addition, a light L of at least one light-emitting module 140 propagates toward the axial direction AD away from the rotating module 130.

Referring to FIGS. 1A and 1D, in the closing mode, the light-emitting direction LD of the at least one light-emitting module 140 faces the rear end RE of the first body 110. That is, the light L of the at least one light-emitting module 140 is adapted to directly or indirectly illuminated to the rear end RE of the first body 110. Specifically, referring to FIG. 1A, the light L of the at least one light-emitting module 140 is parallel to the first body 110, or the included angle C is between the light L and the second body 120. An angle range of the included angle C is between 0° and 60°.

Referring to FIGS. 1B and 1C, in the unfolding mode, the light-emitting direction LD of the at least one light-emitting module 140 faces a front end FE of the first body 110 relative to the rear end RE. That is, the light L of the at least one light-emitting module 140 is adapted to directly or indirectly illuminated to the front end FE and an upper surface TS of the first body 110.

Figure 1E:
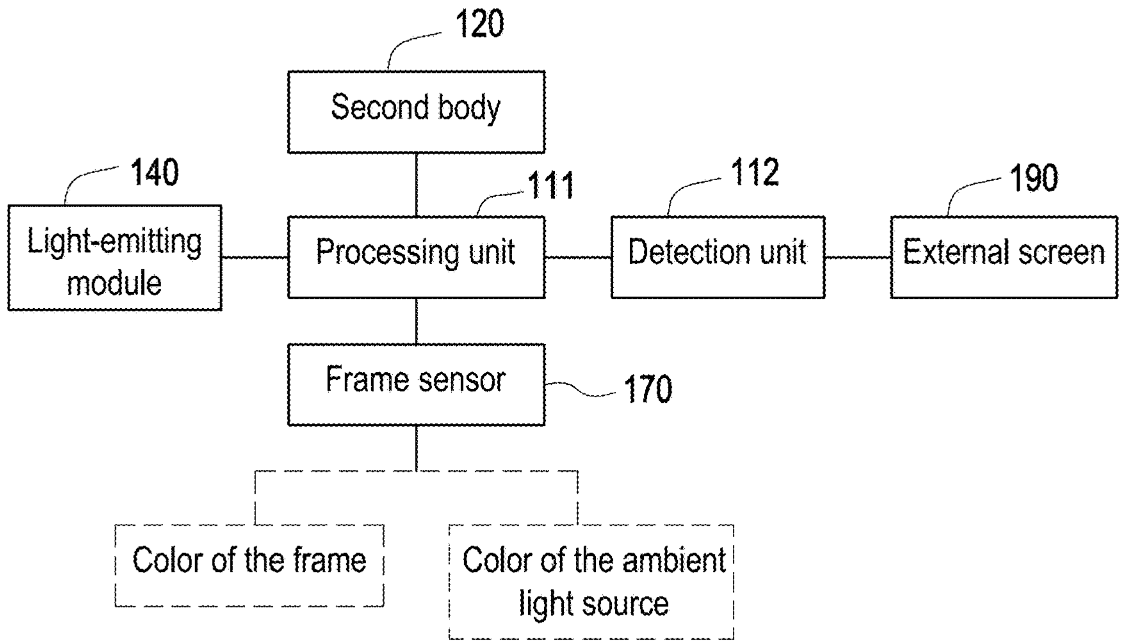
FIG. 1E is a schematic block diagram of some elements of an electronic device according to an embodiment of the disclosure.
Figure 1F:
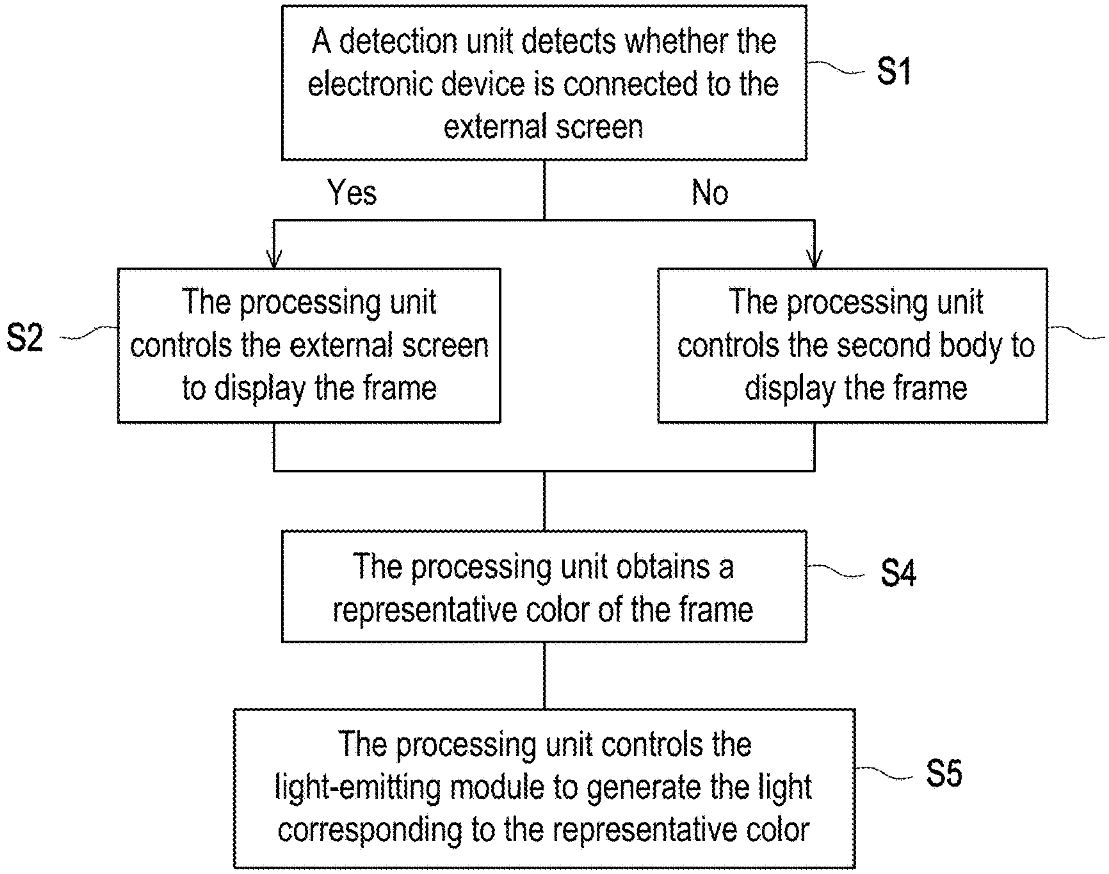
FIG. 1F is a flow chart of a control method of the electronic device in FIG. 1E.

Referring to FIGS. 1A, 1B, and 1E, the electronic device 100 includes a bar-shape cover 150, a reflective member 160 and a frame sensor 170.

The bar-shape cover 150 is disposed on the rear end RE of the first body 110, and has a recess portion 151 and an extension portion 152. The bar-shape cover 150 is formed by a translucent material. The recess portion 151 accommodates the rotating portion 132 of the rotating module 130 and at least one light-emitting module 140. The extension portion 152 is connected to the recess portion 151, and is away from the rear end RE of the first body 110. The reflective member 160 is disposed in the first body 110 and aligned with the recess portion 151 and the extension portion 152. That is, the reflective member 160 is located below the recess portion 151 and the extension portion 152. The frame sensor 170 is disposed on the upper surface TS of the first body 110 or the bar-shape cover 150.

Referring to FIG. 1A, in the closing mode, the light L of the at least one light-emitting module 140 passes through the recess portion 151 to be illuminated to a heat dissipation frame 180 at the rear end RE, and then the light L passes through the heat dissipation frame 180 to propagate to the outside world. The light L will be distributed at the rear end RE of the first body 110 for visual viewing by outsiders. Furthermore, the heat dissipation frame 180 may be a fin protective case.

Referring to FIGS. 1B and 1C, in the unfolding mode, there is an angle A between the second body 120 and the first body 110. The light L of the at least one light-emitting module 140 passes through the recess portion 151 to be illuminated to the reflective member 160, and the reflective member 160 reflects the light L to the extension portion 152. In short, the at least one light-emitting module 140 rotates with the second body 120, so that the at least one light-emitting module 140 faces the recess portion 151. The light L thereof propagates to the recess portion 151, the reflective member 160, and the extension portion 152 in sequence, and finally the light L is distributed on a surface of the extension portion 152, so as to increase a light-emitting range of the front end FE and two sides SE of the first body 110. The frame sensor 170 detects a frame color of the screen 121 or a color of an ambient light source in both the unfolding mode and the closing mode.

Referring to FIGS. 1C to 1E, the light-emitting module 140 in this case reflects the frame color of the screen 121 of the second body 120 according to a sensing result of the frame sensor 170 to generate the light L of the corresponding color, which is applicable to the unfolding mode and the closing mode.

For example, when the electronic device 100 is not connected to an external screen 190, the processing unit 111 of the first body 110 processes all area frames of the second body 120 to obtain a representative color and instruct the light-emitting module 140 to generate the corresponding light L. When the electronic device 100 is connected to the external screen 190, the processing unit of the first body 110 processes all area frames of the external screen to obtain the representative color and instruct the light-emitting module

140 to generate the corresponding light L. In this way, the light-emitting module 140 may generate a color effect similar to that of a display frame.

Referring to FIGS. 1C, 1E, and IF, the following describes a control method of an electronic device in this embodiment. The processing unit 111 is coupled to and controls the at least one light-emitting module 140 to generate the light L. In step S1, a detection unit 112 is coupled to the processing unit 111, and is used to detect whether the electronic device 100 is connected to the external screen 190. In step S2, if yes, the processing unit 111 controls the external screen 190 to display the frame P. In step S3, if not, the processing unit 111 controls the second body 120 to display the frame P. Regardless of whether the electronic device 100 displays the frame P through the external screen 190 or the second body 120, in step S4, the processing unit 111 processes some of areas or all of the areas of the frame P to obtain a representative color of some of the areas or all of the areas. In step S5, then, the processing unit 111 controls the light-emitting module 140 to generate the light L corresponding to the representative color according to the representative color. In addition, the frame sensor 170 is coupled to the processing unit 111, and the frame sensor 170 is adapted to sense the color of the ambient light source. The processing unit 111 corrects the representative color according to the color of the ambient light source and controls the light L corresponding to the representative color.

Based on the above, the way in which the electronic device 100 in this case obtains a representative color of a game frame is related to whether it is connected to the external screen 190. By changing a color of the light-emitting module 140, the users or others may know a screen connection state of the electronic device in this case.

Figure 2:
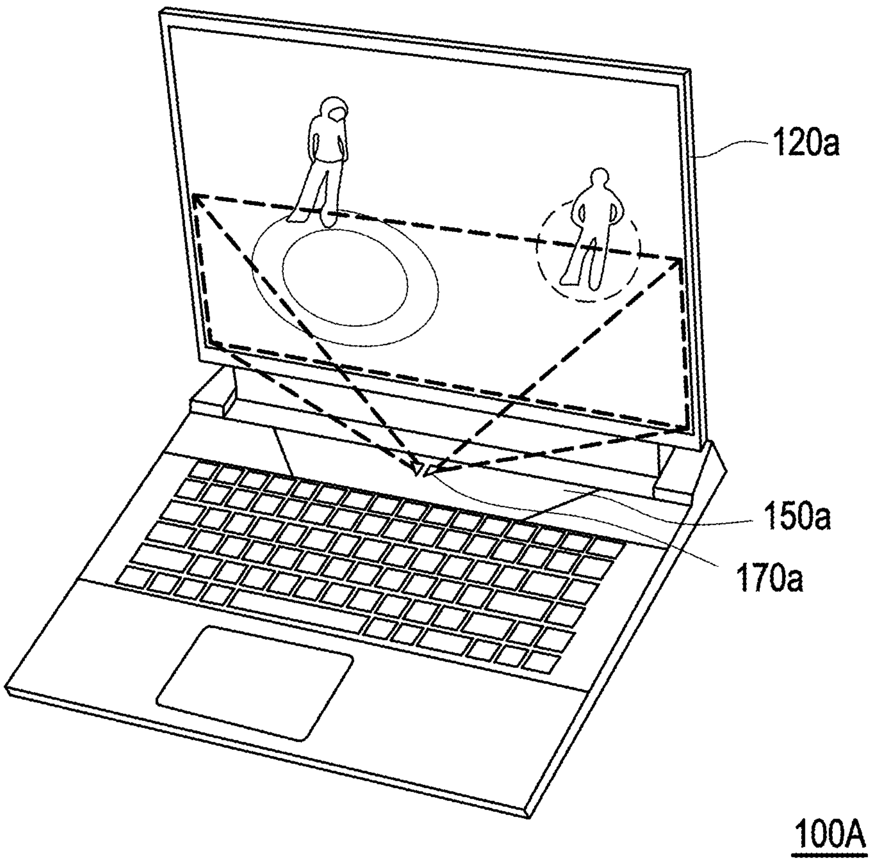
FIG. 2 is a schematic perspective view of an unfolding mode of an electronic device according to another embodiment of the disclosure.

Referring to FIG. 2, there are differences between an electronic device 100A in this embodiment and the electronic device 100 shown in FIG. 1C. The difference is that the electronic device 100A includes a frame sensor 170*a*, which is disposed on a bar-shape cover 150*a*, and the bar-shape cover 150*a* in this embodiment is formed by a transparent material. The frame sensor 170*a* detects a frame color of a second body 120*a* or the color of the ambient light source in the unfolding mode.

When the electronic device 100A is connected to the external screen, the processing unit processes all of the areas of the frame to obtain the representative color of the frame.

When the electronic device 100A is not connected to the external screen, the processing unit processes some of the areas of the frame or the ambient light source to obtain the representative color of the frame.

Some of areas of a frame of the body 120*a* may be preset or defined by a range indicated by the user.

If some of the areas are upper areas, an effect that the color of the light is the same or similar to a representative color of the upper area may be generated. If the representative color of the upper area is different from a representative color of a lower area, an effect of highlighting or gradation of a frame of the lower area may be generated. If some of the areas are the lower areas, an effect that the color of the light is the same or similar to the representative color of the lower area and the frame is extended may be generated.

When the frame sensor 170*a* processes the ambient light source, color correction may be performed on a representative color of a frame of the second body 120*a* according to the color of the ambient light source. Since the way in which the electronic device 100A obtains the representative color is related to whether it is connected to the external screen, the color of the light is changed to allow the user or others to know a screen connection state of the electronic device 100A.

Figure 3A:
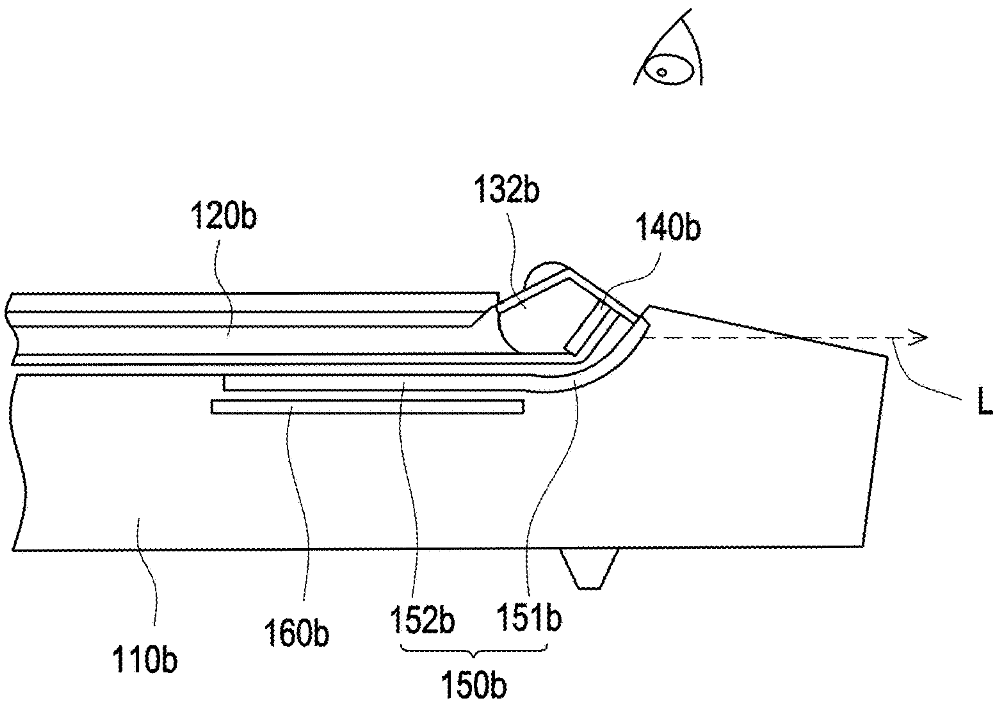
FIG. 3A is a schematic partial side view of a closing mode of an electronic device according to another embodiment of the disclosure.
Figure 3B:
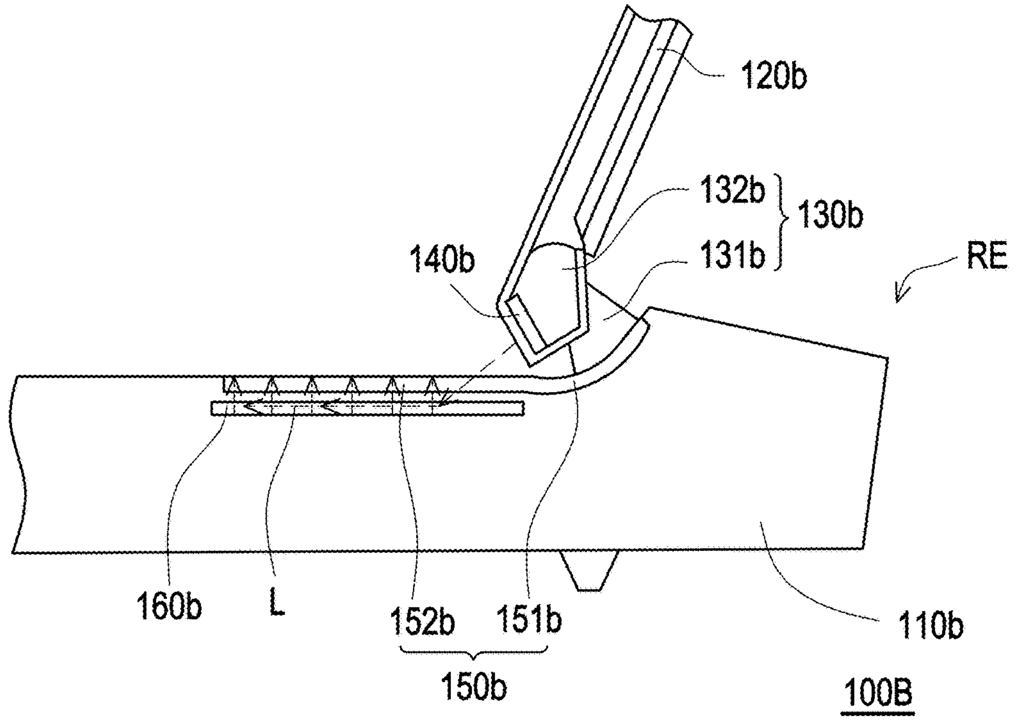
FIG. 3B is a schematic partial side view of an unfolding mode of the electronic device in FIG. 3A.
Figure 3C:
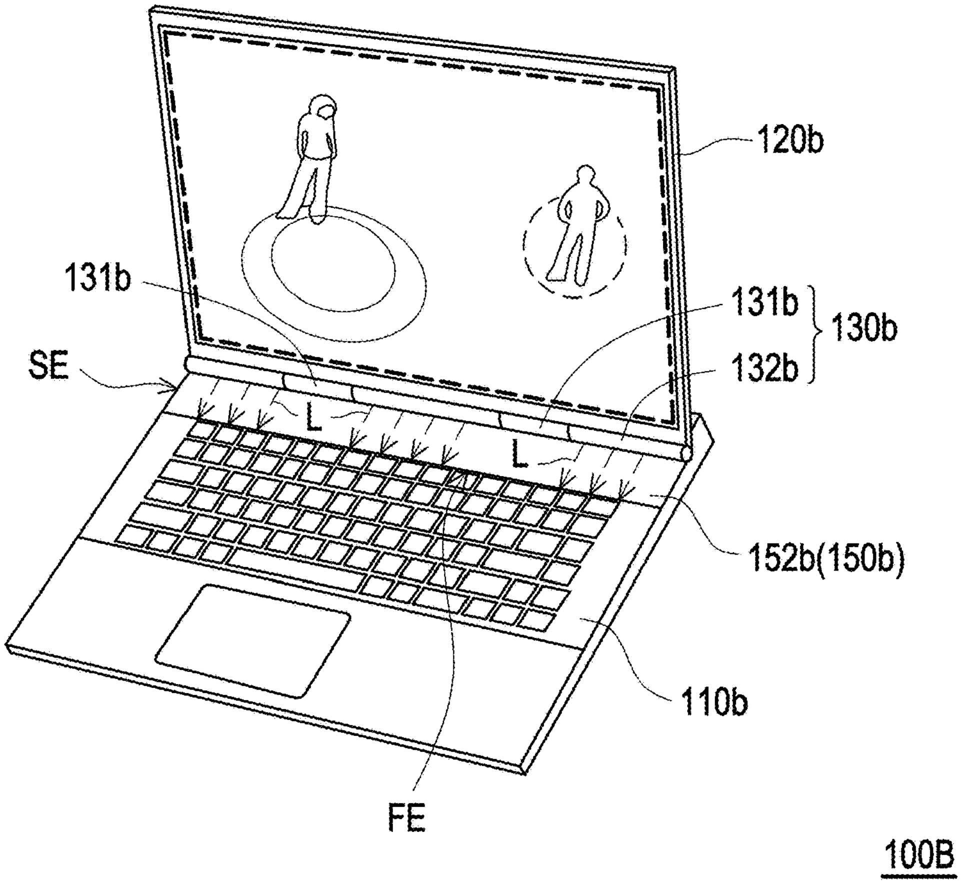
FIG. 3C is a schematic perspective view of the unfolding mode of the electronic device in FIG. 3B.
Figure 3D:
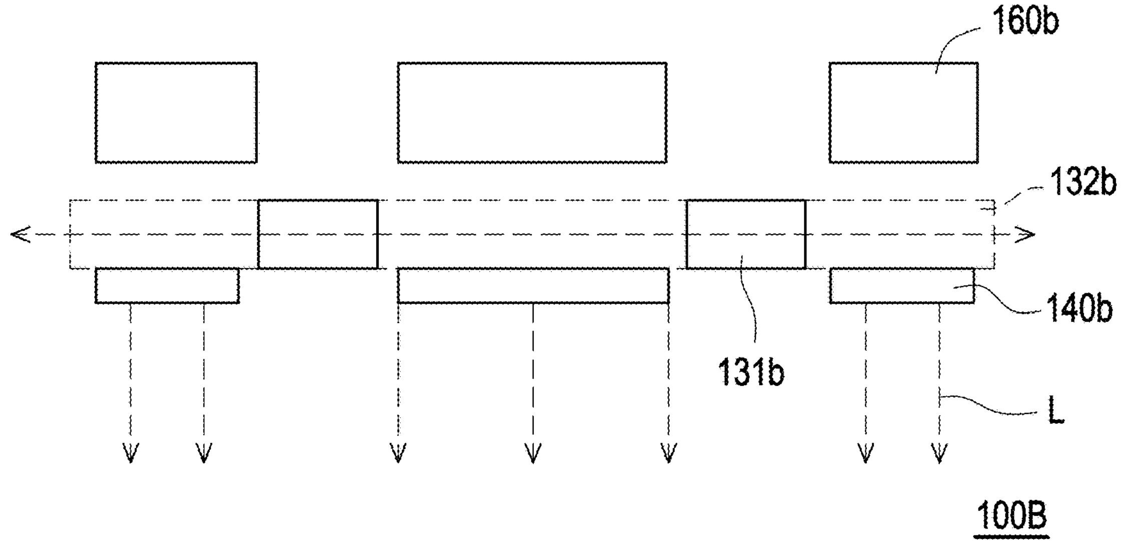
FIG. 3D is a schematic view of an illumination direction of a light-emitting module of the electronic device in FIG. 3A.

FIG. 3A is a schematic partial side view of a closing mode of an electronic device according to another embodiment of the disclosure. FIG. 3B is a schematic partial side view of an unfolding mode of the electronic device in FIG. 3A. FIG. 3C is a schematic perspective view of the unfolding mode of the electronic device in FIG. 3B. FIG. 3D is a schematic view of an illumination direction of a light-emitting module of the electronic device in FIG. 3A.

Referring to FIGS. 3A to 3D, there are differences between an electronic device 100B in this embodiment and the electronic device 100 shown in FIG. 1D. The difference is that a rotating module 130*b* of the electronic device 100B has a five-section structure and includes two positioning portions 131*b* and three rotating portions 132*b*. The two positioning portions 131*b* are fixed on the rear end RE of a first body 110*b*, and are spaced apart from each other. The three rotating portions 132*b* are fixed on a second body 120*b*, and are pivotally connected to the two positioning portions 131*b* respectively. That is, the middle rotating portion 132*b* is pivotally connected to inner sides of the two positioning portions 131*b*, and the rotating portions 132*b* on two sides are pivotally connected to outer sides of the two positioning portions 131*b* respectively.

Referring to FIGS. 3C and 3D, at least one light-emitting module 140*b* includes three, which are respectively disposed on the three rotating portions 132*b* of the rotating module 130*b*.

The electronic device 100B includes a light guiding member 160*b*, which is disposed in the first body 110*b* and aligned with an extension portion 152*b* of a bar-shape cover 150*b*. The bar-shape cover 150*b* is formed by the translucent material.

Referring to FIGS. 3A and 3D, in the closing mode, the light L of each of the light-emitting modules 140*b* passes through a recess portion 151*b* to be illuminated to a heat dissipation frame at the rear end RE, and then the light L passes through the heat dissipation frame to propagate to the outside world. The light L will be distributed at the rear end RE of the first body 110*b* for visual viewing by the outsiders.

Referring to FIGS. 3B and 3C, in the unfolding mode, the light L of each of the light-emitting modules 140*b* passes through the extension portion 152*b* to be illuminated to the light guiding member 160*b*, and the light guiding member 160*b* guides the light L to a full range of the extension portion 152*b*. In short, each of the light-emitting modules 140*b* rotates with the second body 120*b*, so that each of the light-emitting module 140*b* faces the extension portion 152*b*. The light L thereof propagates to the extension portion 152*b* and the light guiding member 160*b* in sequence, and finally the light guiding member 160*b* guides the light L and distributes it on a surface of the extension portion 152*b*, so as to increase the light-emitting range of the front end FE and the two sides SE of the first body 110*b*.

Referring to FIG. 3C, when the electronic device 100B is connected to the external screen, the processing unit processes some of areas of a frame of the second body 120*b* to obtain a representative color of the frame.

When the electronic device 100B is not connected to the external screen, the processing unit processes a lower area of the frame of the second body 120*b* to obtain the representative color of the frame.

Since the way in which the electronic device 100B obtains the representative color of the frame is related to whether it is connected to the external screen, the color of the light is changed to allow the user or others to know a screen connection state of the electronic device 100B.

Figure 4A:
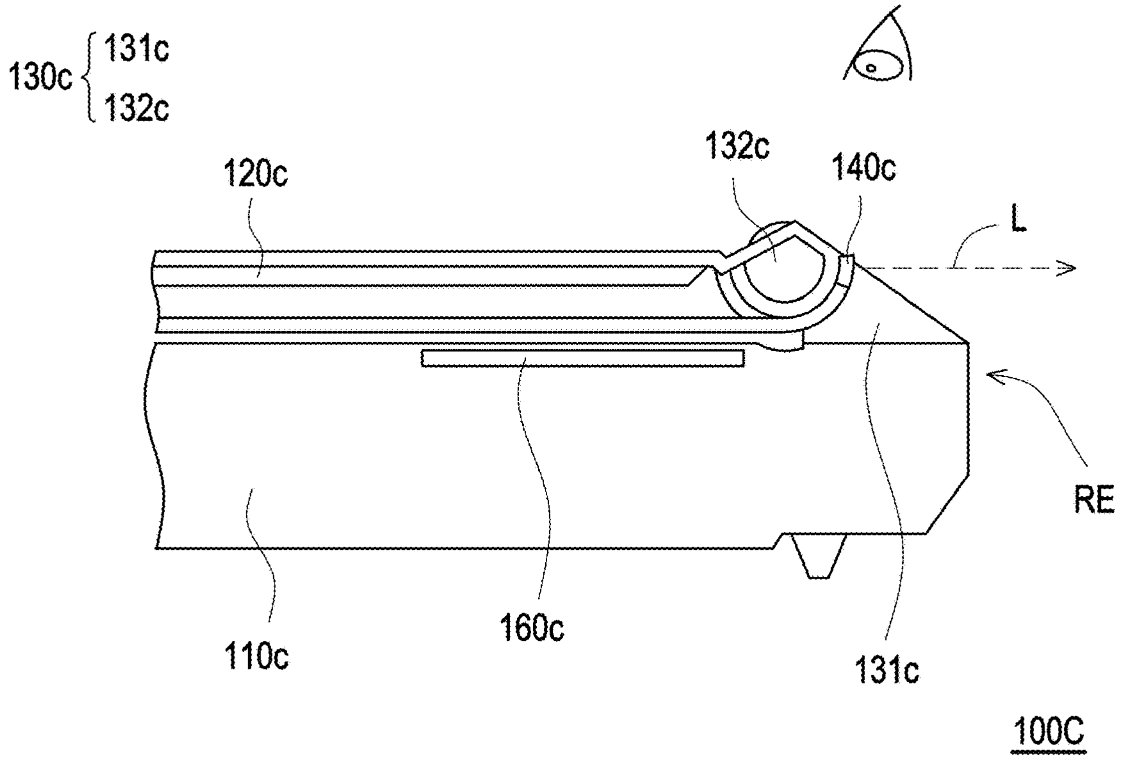
FIG. 4A is a schematic partial side view of a closing mode of an electronic device according to another embodiment of the disclosure.
Figure 4B:
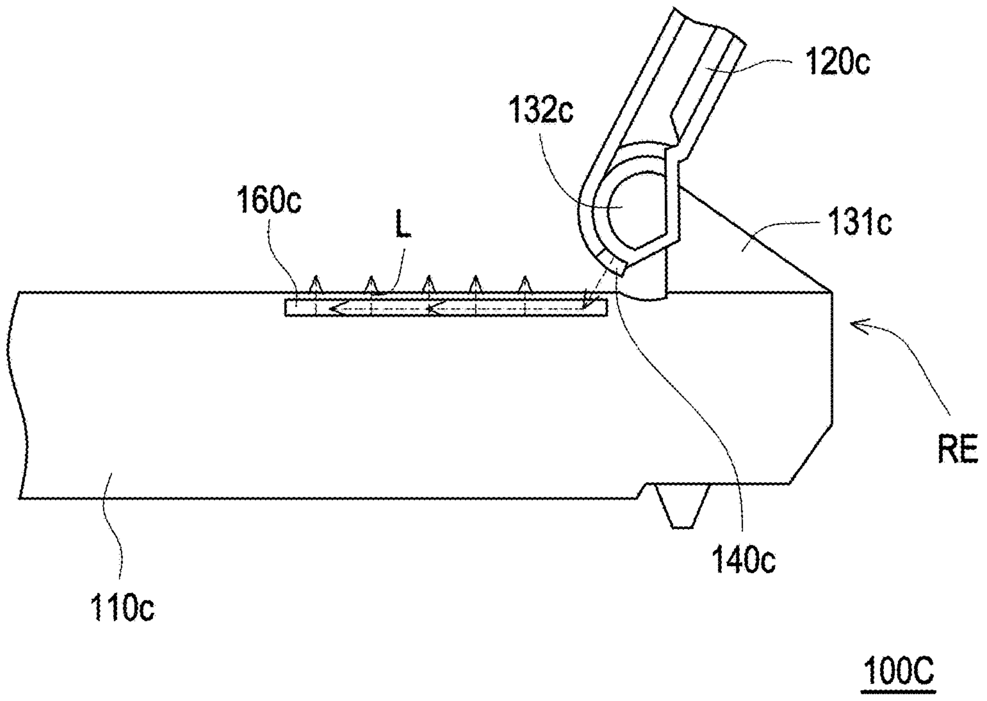
FIG. 4B is a schematic partial side view of an unfolding mode of the electronic device in FIG. 4A.
Figure 4C:
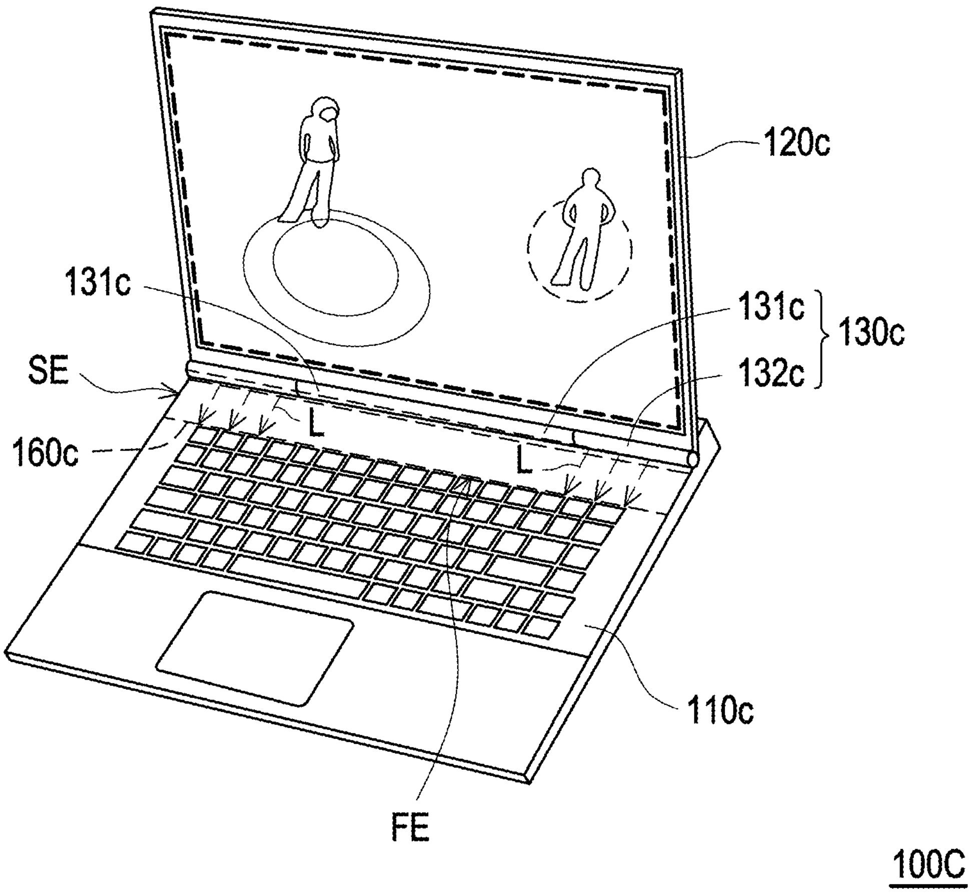
FIG. 4C is a schematic perspective view of the unfolding mode of the electronic device in FIG. 4B.
Figure 4D:
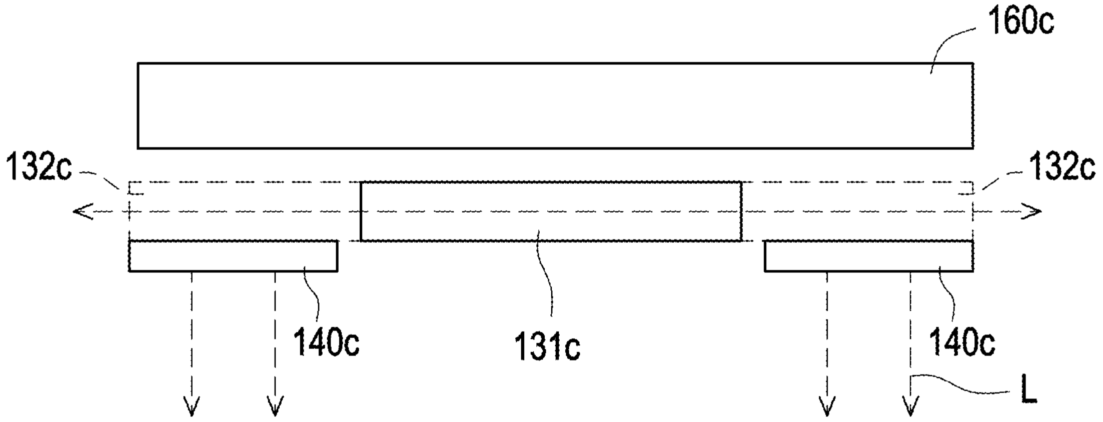
FIG. 4D is a schematic view of an illumination direction of a light-emitting module of the electronic device in FIG. 4A.

FIG. 4A is a schematic partial side view of a closing mode of an electronic device according to another embodiment of the disclosure. FIG. 4B is a schematic partial side view of an unfolding mode of the electronic device in FIG. 4A. FIG. 4C is a schematic perspective view of the unfolding mode of the electronic device in FIG. 4B. FIG. 4D is a schematic view of an illumination direction of a light-emitting module of the electronic device in FIG. 4A.

Referring to FIGS. 4A to 4D, there are differences between an electronic device 100C in this embodiment and the electronic device 100 shown in FIG. 1D. The difference is that a rotating module 130*c* of the electronic device 100C is a three-section structure and includes a positioning portion 131*c* and two rotating portions 132*c*. The positioning portion 131*c* is fixed on the rear end RE of a first body 110*c* and extends vertically to the upper surface TS. The two rotating portions 132*c* are fixed on a second body 120*c* and are spaced apart from each other, and are pivotally connected to two sides of the positioning portion 131*c*. At least one light-emitting module 140*c* includes two, which are disposed on the two rotating portions 132*c* respectively.

The electronic device 100C includes a light guiding member 160*c*, which is disposed in the first body 110*c* and parallel to the upper surface TS. The upper surface TS of the first body 110*c* corresponding to a range of the guiding member 160*c* is formed by the transparent material.

Referring to FIGS. 4A and 4D, in the closing mode, the light L of each of the light-emitting modules 140*c* is illuminated to the rear end RE of the first body 110*c* to propagate to the outside world. The light L will be distributed on the rear end RE of the first body 110*c* for visual viewing by the outsiders.

Referring to FIGS. 4B and 4C, in the unfolding mode, the light L of each of the light-emitting modules 140*c* is illuminated to the light guiding member 160*c*, and the light guiding member 160*c* guides the light L to the upper surface TS of the first body 110*c*, thereby increasing the light-emitting range of the front end FE and the two sides SE of the first body 110*c*.

Referring to FIG. 4C, when the electronic device 100C is connected to the external screen, the processing unit processes a lower area of a frame of the second body 120*c* to obtain a representative color of the frame. When the electronic device 100C is not connected to the external screen, the processing unit processes all of the areas of the frame of the second body 120*c* to obtain the representative color of the frame.

Since the way in which the electronic device 100C obtains the representative color of the frame of the second body 120*c* is related to whether it is connected to the external screen, the color of the light is changed to allow the user or others to know a screen connection state of the electronic device 100C.

Based on the above, in the electronic device of the disclosure, the light-emitting module is installed on the rotating module, so the illumination angle may be changed with the rotation of the rotating module. In the closing mode, the light-emitting module faces the rear end of the first body, allowing the light to propagate in a direction away from the user and display it to others. In the unfolding mode, the light-emitting module faces the upper surface of the first body, allowing the light to propagate to the front and the two sides of the first body for display to the user.

Furthermore, the electronic device of the disclosure does not require multiple light-emitting modules to be installed at multiple positions of the electronic device. Compared to the conventional technology, it may improve disadvantages of taking up the space of the body and being expensive.

What is claimed is:

1. An electronic device, comprising:

a first body;

a second body;

a rotating module connected to the first body and the second body; and at least one light-emitting module disposed on the rotating module;

wherein the second body is adapted to drive the rotating module to rotate relative to the first body along an axial direction to switch to an unfolding mode or a closing mode, in the closing mode, a light-emitting direction of the at least one light-emitting module faces a rear end of the first body, in the unfolding mode, the light-emitting direction of the at least one light-emitting module faces a front end of the first body relative to the rear end.

2. The electronic device according to claim 1, further comprising a bar-shape cover, disposed on the rear end of the first body and has a recess portion and an extension portion, wherein the recess portion accommodates the rotating module and the at least one light-emitting module, and the extension portion is connected to the recess portion and is away from the rear end of the first body.

3. The electronic device according to claim 2, further comprising a reflective member, disposed in the first body and aligned with the recess portion and the extension portion.

4. The electronic device according to claim 3, wherein in the unfolding mode, a light of the at least one light-emitting module passes through the recess portion to be illuminated to the reflective member, and the reflective member reflects the light to the extension portion.

5. The electronic device according to claim 2, wherein in the closing mode, a light of the at least one light-emitting module passes through the recess portion to be illuminated to a heat dissipation frame located on the rear end.

6. The electronic device according to claim 2, wherein the rotating module is a three-section structure and comprises two positioning portions and one rotating portion, and the at least one light-emitting module is disposed on the rotating portion.

7. The electronic device according to any one of claim 2 further comprising a frame sensor, disposed on the bar-shape cover or an upper surface and detects a frame of the second body in the unfolding mode.

8. The electronic device according to claim 2, further comprising a light guiding member, disposed in the first body and aligned with the extension portion.

9. The electronic device according to claim 8, wherein the bar-shape cover is formed by a transparent material or a translucent material.

10. The electronic device according to claim 8, wherein in the closing mode, a light of the at least one light-emitting module passes through the recess portion to be illuminated to a heat dissipation frame located on the rear end.

11. The electronic device according to claim 8, wherein in the unfolding mode, a light of the at least one light-emitting module passes through the extension portion to be illuminated to the light guiding member, and the light guiding member guides the light to the extension portion.

12. The electronic device according to claim 8, wherein the rotating module is a five-section structure and comprises two positioning portions and three rotating portions, and the at least one light-emitting module is disposed on at least one of the three rotating portions.

13. The electronic device according to claim 1, wherein the light-emitting direction of the at least one light-emitting module is away from an axial direction of the rotating module.

14. The electronic device according to claim 13, wherein an included angle is between the light-emitting direction and the second body, and the included angle is between 0 degrees and 60 degrees.

15. The electronic device according to claim 1, further comprising a light guiding member, disposed in the first body.

16. The electronic device according to claim 15, wherein in the closing mode, a light of the at least one light-emitting module is illuminated to the rear end of the first body.

17. The electronic device according to claim 15, wherein in the unfolding mode, a light of the at least one light-emitting module is illuminated to the light guiding member, and the light guiding member guides the light to an upper surface of the first body.

18. The electronic device according to claim 15, wherein the rotating module is a three-section structure and comprises one positioning portion and two rotating portions, and the at least one light-emitting module is disposed on at least one of the two rotating portions.

19. A control system of an electronic device, comprising: the electronic device according to claim 1; and a processing unit coupled to the at least one light-emitting module and controlling the at least one light-emitting module to generate a light.

20. The control system of the electronic device according to claim 19, comprising: a detection unit coupled to the processing unit and configured to detect whether the electronic device is connected to an external screen; wherein if yes, the processing unit controls the external screen to display a frame; and if not, the processing unit controls the second body to display the frame.

21. The control system of the electronic device according to claim 20, comprising: processing, by the processing unit, some of areas or all of the areas of the frame to obtain a representative color of some of the areas or all of the areas; and controlling, by the processing unit, the at least one light-emitting module to generate the light corresponding to the representative color according to the representative color.

22. The control system of the electronic device according to claim 21, comprising: a frame sensor coupled to the processing unit, wherein the frame sensor is adapted to sense a color of an ambient light source; and the processing unit corrects the representative color according to the color of the ambient light source.

* * * * *